United States Patent [19]
Kay et al.

[11] Patent Number: 5,247,571
[45] Date of Patent: Sep. 21, 1993

[54] AREA WIDE CENTREX

[75] Inventors: William A. Kay, Glendora, N.J.; Von K. McConnell, Springfield, Va.

[73] Assignee: Bell Atlantic Network Services, Inc., Arlington, Va.

[21] Appl. No.: 843,040

[22] Filed: Feb. 29, 1992

[51] Int. Cl.$^5$ ............... H04M 3/58; H04M 7/06; H04Q 11/04
[52] U.S. Cl. .................... 379/207; 379/112; 379/212; 379/230; 370/60.1
[58] Field of Search ............ 379/207, 220, 212, 230, 379/112; 370/60, 60.1, 110.1

[56] References Cited

U.S. PATENT DOCUMENTS

| | | | |
|---|---|---|---|
| 4,139,739 | 2/1979 | von Meister et al. | 379/207 |
| 4,160,129 | 7/1979 | Peyser et al. | 379/220 |
| 4,191,860 | 3/1980 | Weber | 379/115 |
| 4,313,035 | 1/1982 | Jordan et al. | 379/207 |
| 4,313,036 | 1/1982 | Jabara et al. | 379/207 |
| 4,348,554 | 9/1982 | Asmuth | 379/113 |
| 4,600,812 | 7/1986 | Gerlits | 379/216 |
| 4,611,094 | 9/1986 | Asmuth et al. | 379/89 |
| 4,611,096 | 9/1986 | Asmuth et al. | 379/207 |
| 4,723,272 | 2/1988 | Maat | 379/211 |
| 4,726,056 | 2/1988 | An et al. | 379/115 |
| 4,754,479 | 6/1988 | Bicknell et al. | 379/207 |
| 4,756,020 | 7/1988 | Fodale | 379/112 |
| 4,757,267 | 7/1988 | Riskin | 379/113 |
| 4,788,718 | 11/1988 | McNabb et al. | 379/113 |
| 4,802,199 | 1/1989 | Lange et al. | 379/221 |
| 4,885,769 | 12/1989 | Beierle | 379/210 |
| 4,899,373 | 2/1990 | Lee et al. | 379/207 |
| 4,955,047 | 9/1990 | Morganstein et al. | 379/112 |
| 5,018,195 | 5/1991 | Hall | 379/225 |
| 5,027,341 | 6/1991 | Jarvis et al. | 370/13 |

OTHER PUBLICATIONS

Bellcore Technical Publication TR-TSY-000402, Issue 2, Jul. 1989, pp. B-1 to B-54.
"Meeting Private Needs with the Public Network," L. Pierce et al., *Bellcore Exchange*, Jan./Feb. 1988, pp. 8-13.
"Evolution in Business Networking", M. Davis et al., *Telesis* 1988 three, pp. 23-31, Bell-Northern Research, Ltd. (Canada).
"The Building of Intelligent Networks . . . ", J. Dunogue et al., *Commutation & Transmission*, No. 2-1989, pp. 5-22, SOTELEC, Paris, France.
"Implementation of ISDN Wide Area Centrex in System 12", K. P. Lathia, *Electrical Communication*, vol. 63, No. 4, 1989, pp. 374-382.

Primary Examiner—Thomas W. Brown
Attorney, Agent, or Firm—Lowe, Price, LeBlanc & Becker

[57] ABSTRACT

The Area Wide Centrex service is provided in a telephone communication network having a plurality of interconnected central office switching systems, each at a different location. Each of the central office switching systems connects to a number of local telephone lines, a number of which can be designated as members of a business group for a particular customer. Area Wide Centrex extends a number of service features to the business group over a broad area through multiple central offices by taking the programming intelligence capacity out of the central offices and moving it to a central point. Service features such as call routing are controlled by data stored in a central data base. Establishing or changing services for one or all of a particular customer's lines requires only reprogramming that customer's data in the central data base, without the need to reprogram each central office switch. Also, Centrex services such as extension number type intercom dialing and call transfer can be extended across provided to groups of lines connected to different exchanges.

9 Claims, 9 Drawing Sheets

AREA WIDE CENTREX

TECHNICAL FIELD

The present invention relates to methods and system structures for providing private network service features to business customers with facilities at a number of geographically diverse locations through the public telephone network. The new service would extend Centrex service features to a multiple end office environment.

Acronyms

The written description uses a large number of acronyms to refer to various services and system components. Although known, use of several of these acronyms is not strictly standardized in the art. For purposes of this discussion, acronyms therefore will be defined as follows:
  Area Wide Centrex (AWC)
  Action Control Point (ACP)
  Advanced Intelligent Network (AIN)
  Advanced Services Platform (ASP)
  Common Channel Inter-office Signalling (CCIS)
  Data and Reporting System (DRS)
  Integrated Service Control Point (ISCP)
  North American Memory Plan (NAMP) Number
  Private Branch Exchange (PBX)
  Private Automatic Branch Exchange (PABX)
  Service Control Point (SCP)
  Service Management System (SMS)
  Service Switching Point (SSP)
  Signaling Transfer Point (STP)
  Station Message Detail Recording (SMDR)
  Service Creation Environment (SCE)
  Transaction Capabilities Applications Protocol (TCAP)

BACKGROUND ART

In the past, providing advanced communications features to large companies with facilities at different locations required interconnection of a number of privately owned exchanges. U.S. Pat. No. 4,802,199 issued Jan. 31, 1989, to Michael D. Lange et al., for example, discloses a multiple exchange system aimed at the needs of large customers having facilities at a number of different geographic locations. The system provides repertory dialing through the switched network to set up connections between the different PBXs to emulate a dedicated private line connection. The system supports speed or repertory dialing, SMDR reporting and automatic routing features. The requisite processing capability for setting up the virtual private line connections between exchanges and providing special service features is located in the individual private exchanges. For example, the SMDR data acquisition apparently occurs on a switch by switch basis; each switch accumulates SMDR data in response to a subscriber accessing the virtual facility through that switch (column 4, lines 35-65). The problem with this approach is that the company must own, operate and maintain some form of private exchange at each of its locations. Also, in the Lange et al. system, the exchanges are PBXs interconnected via public or private switched network lines, and the company incurs the expense of these lines as well.

Rather than providing business services through a private exchange, such as a PBX, Centrex takes a group of normal telephone lines and provides call processing to add business features to the otherwise standard telephone lines. For example, the Centrex exchange adds intercom capabilities to the lines of a specified business group so that a business customer can dial other stations within the same group using extension numbers, such as a two, three or four digit numbers, instead of the full telephone number associated with each called line or station. Other examples of Centrex service features include call transfer between users at different stations of the business group, a number of varieties of call forwarding and speed calling. Clearly Centrex adds a bundle of business features on top of the standard telephone line so that whatever a station or communication equipment a customer places on that line will interact with the business system features.

Thus Centrex is a package of features that are placed or added onto the standard service provided via telephone lines that allow a group of lines assigned to a business customer to operate as a business system Centrex typically provides business services similar to those provided by a PBX or PABX through a central office exchange of the public telephone network but without requiring the customer to purchase and maintain a private exchange.

A problem with the existing Centrex is illustrated by call transfer. In the existing service, a business customer receives a call on one line but decides the caller should talk to an employee on another line. The currently connected individual could flash the switch hook and dial the second employee's extension number and hang up. The call is transferred by the central office over to the line of the second employee. If provided by a prior art Centrex, the transfer is confined to one central office. Consequently, the transfer feature works only so long as all of the employees of the particular business customer are served by the same central office.

One way the problem of multiple locations has been addressed in the past is for the customer to purchase private tie lines to connect remote facilities to the customer's exchange. In effect, when a remote employee wanted to call through the network to another employee, the remote employee took the station set off-hook and the set connected through a tie line to the distant exchange which provides the customer with the Centrex service. The calling employee then received the dial tone of the distant exchange via the tie line. Use of such private lines, however, incurs mileage charges for the wires strung from the exchange to each distant extension. Using digital switches, to achieve a similar result requires deployment of a remote switching module at the remote locations to supply foreign dial tone and connect the remote switching modules to the distant exchange via a fiber optic trunk. Every prior art system for extending Centrex type services to distant customer facilities therefore does involve some form of private line to the remote locations.

Another problem relating to existing business services is illustrated by call routing. This type of service for outgoing calls selects one of three different line or trunk groups to place a call through. For a call from one city going to a distant city there might be a choice of going first via a Tie line, second to MCI and then to some kind of AT&T WATS line. Typically, a customer uses such call routing to control communication costs. The selection is made on a priority basis established by the customer in whatever manner produces the most economical use of their facilities. In the existing network, however, such call routing is controlled at the central office level of the network. The route selection priority for each Centrex line is programmed in the central office to which the line connects, and changing the priority for any given line requires a technician to go out to the exchange switch and change the wiring and/or programming of that particular switch. Thus, if a business customer has multiple geographic locations connected to different central offices, if the customer desires to change the call routing priority for all locations, technicians would have to modify wiring and/or install another program table in each central office.

Where the customer has a large number of lines to stations dispersed over a variety of geographic locations, typically a number of lines connect to one local central office and other lines connect to one or more remotely located central offices. In such a situation, some services, such as the call transfer discussed above, cannot be provided for all lines. Also, those services that can be provided require extensive programming and/or wiring at each connected central office switch to establish or change the service parameters as was discussed above with regard to call routing. Thus clearly a need exists for providing business type features to customers with facilities at a number of geographically diverse locations through the public telephone network.

In recent years, a number of new service features have been provided by an Advanced Intelligent Network (AIN). In an AIN type system, central offices send and receive data messages from an Integrated Services Control Point (ISCP) via a Switching Transfer Point (STP). At least some calls are then controlled through multiple central office switches using data retrieved from a data base in the ISCP. The prior development of an AIN, however, has concentrated on specific service features which are quite different from Centrex and have not extended Centrex type groups of business features to customers with facilities at a number of geographically diverse locations through the public telephone network.

U.S. Pat. No. 4,756,020 issued Jul. 5, 1988, to Joseph V. Fodale, for example, suggests access authorization in a multiple office environment. The Fodale system restricts access to a long distance telephone network based on the status of the billing number associated with the call, i.e. delinquent. The access control is provided through multiple local and toll offices but is centrally controlled by a data base which stores account status information. The local office serving a calling telephone extends a toll call to the toll office of the toll network carrier. The toll office queries the data base via a CCIS link regarding the current status of the customer's account identified by the billing number associated with the call. The data base obtains the status information of the billing number in question and translates that status into a response message instruction to allow or disallow extension of the toll call through the toll network. The data base transmits the response message to the toll office via CCIS link, and the toll office disallows or extends the call through the toll network as instructed by the response message.

A number of the features provided by the prior art AIN type intelligent networks relate to specialized call processing of incoming calls, as discussed below.

U.S. Pat. No. 4,191,860 issued Mar. 4, 1980, to Roy P. Weber discloses a system for providing special processing of incoming calls via a number of local switching offices based on information stored in a central data base. The local and toll offices of the telephone network compile a call data message and forward that message via a CCIS link to the central data base, essentially a Service Control Point or SCP. The data base at the SCP translates the dialed INWATS number, included in the message, into a call control message. The call control message includes an unlisted destination telephone number, which is then returned to the offices of the network via CCIS link. The network uses the call control message to complete the particular call.

U.S. Pat. Nos. 4,611,094 and 4,611,096 both to Asmuth et al. (hereinafter Asmuth et al.) disclose a system for providing custom incoming telephone call processing services to a corporate customer operating at geographically dispersed locations through a plurality of local office switches. A customer program stored in a central data base is accessed to provide instructions to the switches to complete incoming calls to customer locations in accord with special services defined by the corporate customer. Incoming calls to the customer are routed to an Action Control Point (ACP) which typically is a modified toll office. The ACP has a number of "primitive" call processing capabilities, such as providing voice prompts to callers and receiving additional caller inputs. The customer program controls the ACP's to string together the desired primitive call processing capabilities to process each call to the customer. Specified parameters stored in the program, such as time of day, caller location and data inputs responsive to the voice prompts, determine the final customer station to which each call should be completed. The customized call processing disclosed by Asmuth et al. can also include customized billing for calls, e.g, by splitting charges between the customer and the caller. The Asmuth et al. system sets up a billing record for each call in the ACP or toll office. Asmuth et al. also teach procedures for handling of calls directed to a corporate customer when the call serving office does not have all of the capabilities needed for processing the call in accord with the customer's stored program. In particular, upon recognition of the deficiencies of the call serving office, the Asmuth et al. system transfers call processing to a second office having adequate capabilities for completion of the call.

U.S. Pat. No. 4,788,718 issued Nov. 29, 1988, to Sandra D. McNabb et al. suggests centralized recording of call traffic information. The architecture is similar to that disclosed by the earlier discussed patents to Weber and Asmuth et al. to the extent that local and toll offices communicate with a central data base via CCIS link. The McNabb et al. system improves over the incoming call routing provided by the Weber patent and the two Asmuth et al. patents discussed above by adding a data gathering function to the centralized data base which stores the individual customer's call routing program. In McNabb et al. the central data processor provides call attempt records and a traffic data summary of all calls directed to a particular 800 number.

U.S. Pat. No. 4,757,267 issued Jul. 12, 1988, to Bernard J. Riskin discloses routing of an 800 number call, where the dialed number identifies a particular product or service, to the nearest dealer for the identified product or service. The toll office sends a message including the dialed 800 number and the area code of the caller to a data base which translates this into a standard ten digit telephone number for the nearest computer at a Customer/Dealer Service Company (CDSC). The telephone network then routes the call to this computer, which answers the call and provides a synthesized voice response. The computer uses call data and or Touchtone dialed information from the caller to identify the selected product or service and then accesses its own data base to find the telephone number of one or more nearby dealers in that product or service. The computer then calls the dealer and connects the original caller to the called dealer.

Several other patents use a network similar to the AIN type intelligent network to provide personalized services to individual subscribers, for example when they are away from their home telephone station.

U.S. Pat. No. 4,313,035 issued Jan. 26, 1982, to David S. Jordan et al. patent discloses a method of providing a person locator service through multiple exchanges of the switched telephone network. Each subscriber is assigned a personal number uniquely identifying the subscriber. An absent subscriber inputs a number to which calls are to be completed, such as the number where the subscriber can be reached, into a central data base. A caller wishing to reach the subscriber dials the number uniquely identifying that subscriber. In response to an incoming call directed to the unique number, a telephone switching office having access to CCIS sends the dialed number to the central data base referred to by Jordan et al. as an SSP. The data base retrieves the stored completion number for the called subscriber and forwards that number back to the switching office to complete the call. The subscriber can update the stored data from any telephone. Also, the subscriber can specify whether to charge calls via the person locator system to the subscriber or to the caller.

U.S. Pat. No. 4,899,373 issued Feb. 6, 1990, to Chin-mei Lee et al. discloses a system for providing special telephone services to a customer on a personal basis, when the customer is away form his or her home base or office. A nationally accessible data base system stores feature data in association with personal identification numbers. A subscriber wishing to use personalized features while away from home base dials a special code from a station connected to any exchange which has access to the data base and presents the personal identification number. The corresponding feature data is retrieved from the data base and stored in the exchange in association with the station from which the request was initiated. The exchange then provides telephone service corresponding to the subscriber's personalized telephone features. A temporary office arrangement may be established in which the personalized features will be immediately available on incoming and outgoing calls for a period of time specified by the subscriber.

The prior art does not suggest extending the full range of Centrex type services to groups of lines assigned to business customers with facilities at a number of geographically diverse locations, without resort to private line connections between dispersed customer facilities.

DISCLOSURE OF THE INVENTION

1. Objectives

One objective of this invention is to provide a collection of Centrex type telephone communication features to a business customer's group of lines over a wide area where the group of lines connect to a plurality of central offices.

Another objective is to provide Centrex type telephone communication features to business line groups of essentially unlimited numbers of lines.

A further objective of the invention is to provide dynamic control of the Centrex type telephone communication features. More specifically, the features would be controlled through a central programmable data base so that establishing or changing service features requires only programming of the central data base, regardless of the number of different central offices through which the service is provided to any particular customer.

2. Summary

Area Wide Centrex is intended to extend a number of services over a much broader area through multiple central offices by taking the programming intelligence capacity out of the central office and moving it to one or more centralized control points. Service features such as call routing are controlled by data stored in a central data base in one of the control points. Establishing or changing services for one or all of a particular customer's line requires only changing that customer's data in the data base. There is no need to reprogram each central office switch. Also, services, such as extension number type intercom dialing and call transfer, which could be provided only between lines connected to the same exchange can be extended across exchanges.

The call processing methods of the Area Wide Centrex service can be provided in a communication network having a plurality of interconnected central office switching systems, each at a different location. Each of the central office switching systems connects to a number of local communication lines. Each central office switching system normally responds to a request on a local communication line connected thereto to selectively connect the requesting line to another selected local communication line. The connection can be made locally through only the connected central office switching system, but when the called line connects to a distant station the connection is made through the connected central office switching system and at least one other central office switching system.

In a first aspect, the invention is a method of providing Centrex services in the multiple central office switching system network. This method includes the step of designating at least one of the local communication lines connected to each of the central office switching systems as members of a business group. A central data base stores data for providing a plurality of Centrex service features to the business group. The Centrex service features include at least extension number dialing, call transfer and call routing control. A request for service is received in one of the central office switching systems from one of the connected local communication lines. The method further includes the steps of recognizing that the service request originates from one of the designated local communication lines, and accessing the central data base to obtain call processing data associated with the business group for a selected one of the Centrex service features. The service processing method then provides the selected Centrex service feature to the one designated line based on the accessed call processing data.

Typically, the recognition that the service request originates from one of the designated local communication lines occurs at the central office switch level. The central office uses this recognition to decide whether to launch a query to the central data base or to rely on call processing programs in the central office switch itself. If the switch lacked the capability to recognize whether or not a call originates from one of the designated local lines, the switch could forward the call to a higher level switch to perform the requisite translation. In a further alternative, the switch could query the central data base in response to each and every service request, and the data base would then determine whether or not the originating line is a member of the business group.

In another aspect, the invention consists of a call transfer method. At least one of the local communication lines connected to each of at least two of the central office switching systems are designated as members of a business group. During an existing call connection through at least one of the central office switching systems to one of the designated local communication lines, the system receives a transfer request from the one of the designated local communication lines. The transfer request identifies another of the designated lines. The system recognizes that the service request originates from a line which is a member of the business group, and places the existing call on hold. A central data base, separate from the central office switching systems, is accessed to obtain call processing data to transfer connection from the one designated line to the other designated line. One or more of the central office switching systems then utilize the accessed call processing data to transfer the existing call to the other of the designated lines. This approach allows transfer of calls between any two stations within the designated business group, regardless of which of the different central office switches each station is connected to.

In another aspect, the invention consists of a portable intercom dialing method. At least one of the local communication lines connected to each of at least two of the central office switching systems are designated as members of a business group. The method includes the steps of assigning an extension number to each of the designated local communication lines which is independent of the value of the unique line identification number of the line each extension number is assigned to. A translation table identifying the correspondence between each extension number and the unique line identification number for each line of the business group is stored in a central data base. The central data base is separate from the central office switching systems. When customer personnel move to a different location, the method requires revising the translation table to change the correspondence between an extension number and one of the unique line identification numbers. The revision serves to assign the one extension number to a different local communication line. When an extension number from one of the designated local communication lines is received, the system accesses the revised translation table for the business group to retrieve the unique line identification number which currently corresponds to the received extension number. The network then establishes a communication link between the one of the designated local communication lines and the local communication line indicated by the retrieved unique line identification number. This method allows a business customer to transfer an extension number across dialing exchange boundaries along with a moving employee, even though the actual telephone numbers assigned to each line do not change.

In another aspect, the invention consists of a method of extending the Area Wide Centrex service features to one or more lines which are not members of the group. This aspect of the invention provides a "Work-At-Home" type service. The method includes the steps of designating at least one of the local communication lines connected to each of the central office switching systems as members of a business group and storing in the central data base data identifying at least one communication line which is not a member of business group as associated with one of the members of the business group. The central data base also stores data for providing a Centrex communication service to the business group. The method further comprises the steps of receiving a request for the Centrex communication service in one of the central office switching systems from one of the connected local communication lines and checking the stored identifying data to recognize that the service request originates from the associated non-member line. The system then accesses the central data base to obtain call processing data associated with the business group, and provides the Centrex communication service to the associated non-member line based on the accessed call processing data.

The "Work-At-Home" feature allows billing for the Centrex communication service against the line of the business group associated with the non-member line based on the identifying data stored in the central data base. The central data base can also store data for providing a plurality of Centrex services to the business group wherein the plurality of services include at least extension number dialing, call transfer and call routing control. These services can then be provided both to the members of the group and to the associated non-member line.

Access authorization control can be added to any feature of the Area Wide Centrex. For a call originating at any station covered by the Area Wide Centrex service, the end user dials the desired directory number in response to which the network suspends call processing and requests (using voice announcements) that the end user enter an authorization code, for example using DTMF digits. The network checks the entered code against a list of valid codes provided by the subscriber. If the subscriber has specified additional screening, the calling number could also be matched against a list of valid calling numbers. If the code is valid (and the calling number when used), the network resumes call processing and routes the call to the appropriate destination. Alternatively, calls could be screened based on calling number alone, without an entered authorization code.

Centralized station message detail recording can also be added to any feature of the Area Wide Centrex. The customer specifies the information to be collected, the method and time of information collection, the type of results, and the format and frequency of reports. For a call originating at any station covered by the Area Wide Centrex service, the central data base accumulates data relating to usage of the Centrex communication services. The message detail data can then be down loaded to the customer as often as specified.

In another aspect, the invention is an area wide centrex communication network. The network includes local communication lines and a plurality of interconnected central office switching systems each at a different location. Each of the central office switching systems connects to a plurality of the local communication lines. Also, each of the central office switching systems responds to a request on a local communication line connected thereto to selectively provide a communication connection between the requesting line and another selected local communication line. The connection can be made locally through only the connected central office switching system, but when the called line connects to a distant station the connection is made through the connected central office switching system and at least one other central office switching system. The network further includes a central data base, separate from the central office switching systems. The central data base stores call processing data associated with at least one of the local communication lines connected to each of at least two of the central office switching systems, such that the lines are identified as members of a business group. The stored call processing data includes data for a plurality of Centrex service features available to the business group. The Centrex service features include at least extension number dialing, call transfer and routing control. A signalling communication system provides two-way communications of data messages between the central office switching systems and the central data base. In response to a request for service from one of the designated local communication lines, the central office switching system connected to that one line initiates access to the central data base. The access serves to obtain call processing data associated with the business group for a selected one of the Centrex service features. Then, in response to the obtained call processing data, the network provides the selected Centrex service feature to the one designated line.

In a preferred implementation, each of the at least two of the central office switching systems comprises a programmable digital switch. Each programmable digital switch in the network may be programmed to recognize that the service request originates from one of the designated local communication lines. Alternatively, each programmable digital switch may respond to every service request by initiating a query to the data base, in which case the data base stores sufficient data to recognize that the service request originates from one of the designated local communication lines.

The Area Wide Centrex communication system may also include at least one switching transfer point for routing data messages between the central office switching systems and the data base. Common channel interoffice signalling links provide communications between the central office switching systems and the switching transfer point, and a packet switched network provides communications between the switching transfer point and the central data base.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Area Wide Centrex is implemented using an Advanced Intelligent Network (AIN) type architecture. One example of an AIN system for implementing the Area Wide Centrex service on a statewide basis appears in simplified block diagram form in FIG. 1.

Figure 1:
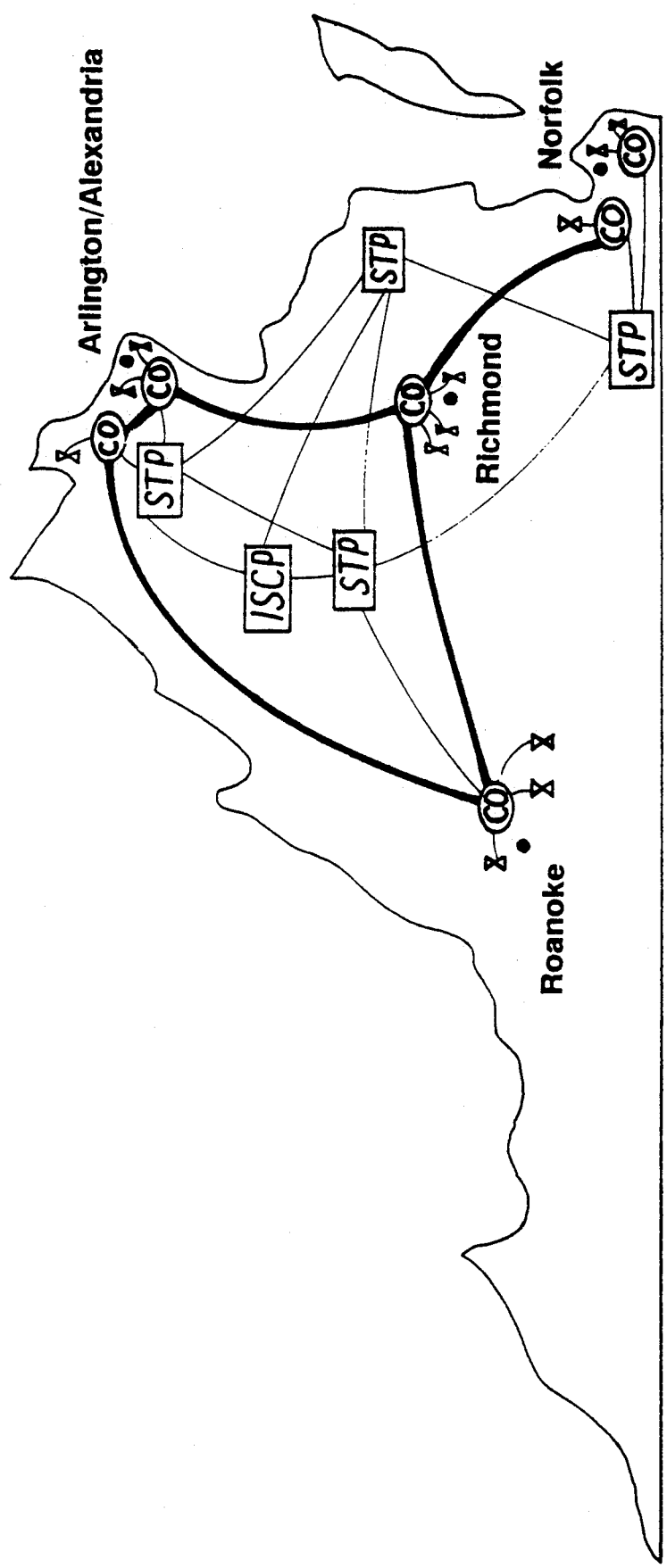
FIG. 1 shows in simplified block diagram form an Advanced Intelligent Network system for implementing the Area Wide Centrex service on a statewide basis.

In the simplified example shown in FIG. 1, central office switches or CO's are located throughout the state. Local telephone lines connect individual telephone stations in each geographic area to the closest CO. Each CO connects via trunk circuits (shown in the drawing as bold lines) to one or more of the other CO's, and each CO has a CCIS data link to an STP. The trunk circuits carry large numbers of telephone calls between the CO's. CCIS data communication is provided via links to signaling transfer points (STP's). In the illustrated example, the two CO's in the Arlington/Alexandria area connect to a nearby first STP. The two CO's in Norfolk connect to a second STP which is located in that part of the state. The Richmond CO connects to a third STP, and the Roanoke CO connects to a fourth STP. The STP's provide call processing data transfer between the various CO's and between the CO's and the Integrated Service Control Point (ISCP).

Area Wide Centrex could be implemented with one or more ISCP's per state, as in the FIG. 1 implementation, to avoid overloading existing CCIS data links. Alternatively, the ISCP could be implemented on a LATA by LATA basis or on a regional operating company basis, i.e. one data base for the entire geographic area serviced by one of the Regional Bell Operating Companies. In fact, if federal regulations permitted, the data base service could become nationwide.

A business customer may have facilities in several locations throughout the regions or state served by the Area Wide Centrex system. For example, company X may have headquarters in Richmond, a shipping facility in Norfolk, an assembly plant in Roanoke and a lobbyist's office in the Arlington/Alexandria area. Individual telephone lines to each of the company's facilities would be designated as members of that company's business group. The lines could be lines into a PBX at the headquarters, a key system at the lobbyist's office and plain old telephone lines into the plant and the shipping facility. Each of the central office switching systems connects to a number of local communication lines which in turn connect to communication terminals. Although shown as telephones in FIGS. 1 and 2, the terminals can comprise any communication device compatible with the line. Where the line is a standard voice grade telephone line, for example, the terminals could include facsimile devices, modems etc.

Figure 2:
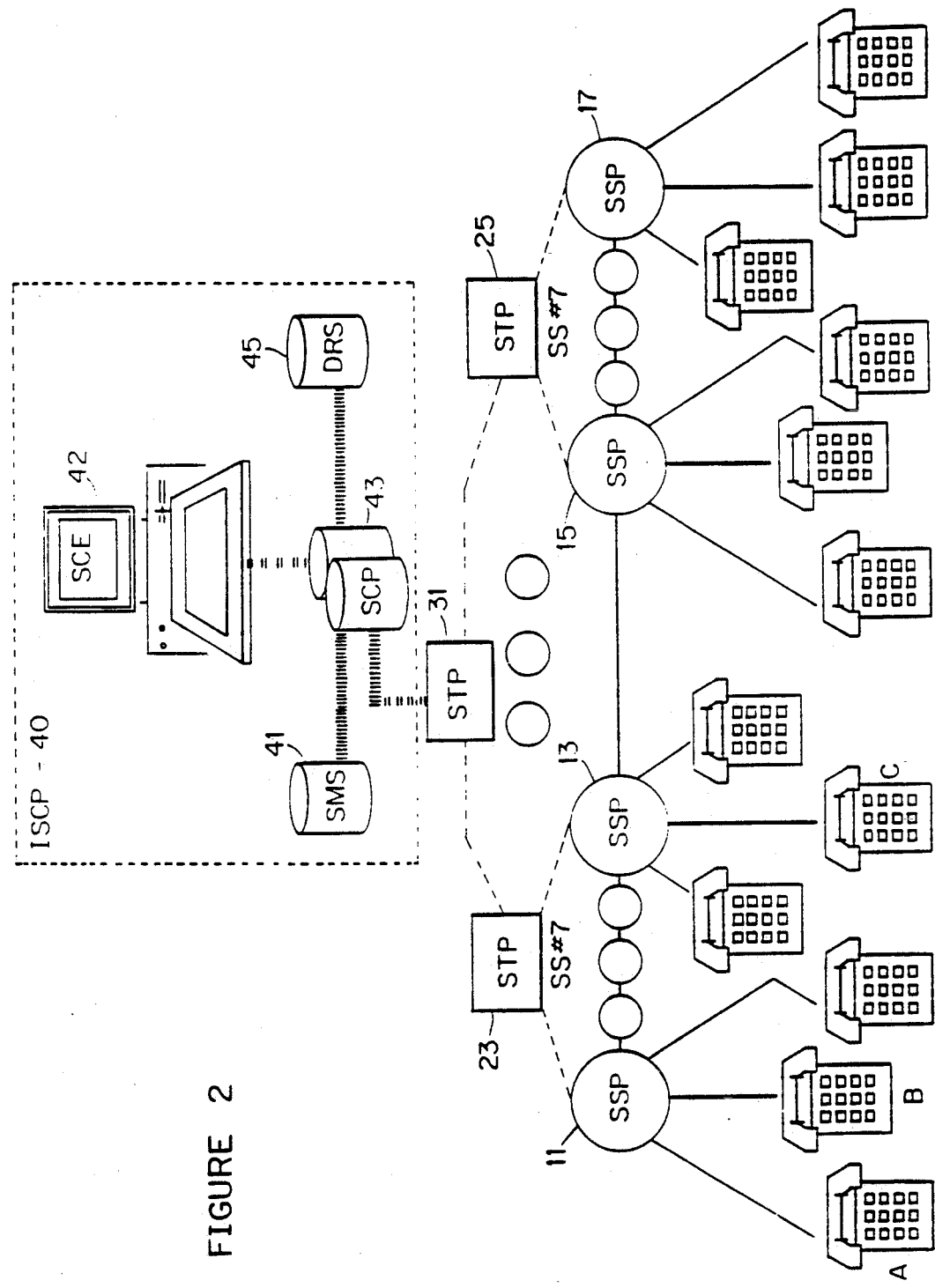
FIG. 2 is a schematic block diagram of the components of an Advanced Intelligent Network system similar to that of FIG. 1 but showing somewhat more detail of the first embodiment of the system for implementing the invention.

FIG. 2 is a schematic block diagram of the components of AIN similar to the system of FIG. 1 but showing somewhat more detail of the first embodiment of the system for implementing the invention. In this figure, each of the CO's are labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls.

SSP's can be programmed to recognize a number of different triggers as an indication that a call is an AIN call. The trigger can relate to the terminating station, but in Area Wide Centrex the trigger is typically the identification of the telephone line from which a call or other request for service originates. Generally, for Area Wide Centrex, a number of lines are designated as members of a business group serviced by the Area Wide Centrex. The SSP's then trigger AIN type servicing based on origination of the call or service request from a line designated as a member of one of the business groups subscribing to Area Wide Centrex.

As shown in FIG. 2, all of the CO's 11, 13, 15 and 17 are equipped and programmed to serve as SSP's. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSP's. The illustrated embodiment is perhaps an ideal implementation which would make Area Wide Centrex widely available at the local office level throughout the network. As will be discussed later, with respect to FIGS. 8 and 9, other implementations provide the SSP functionality only at selected points in the network, and end offices without such functionality forward calls to one of the SSP's.

The Area Wide Centrex implementation of FIG. 2 includes a number of the SSP capable CO switches, such as the SSP's shown at 11, 13, 15, and 17. The SSP type central offices are each at a different location and distributed throughout the area, region or country served by the Area Wide Centrex system. In the example of FIG. 1, each of the CO's in the state would comprise an SSP type central office switching system.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. In FIG. 2, as in FIG. 1, the central offices or SSP's are interconnected to each other by trunk circuits (shown in the drawing as bold lines) for carrying telephone services.

The local area STP's 23 and 25, and any number of other such local area STP's shown as black dots between STP's 23 and 25 communicate with a state or regional STP 31. The state or regional STP 31 in turn provides communications with the ISCP 40. The STP hierarchy can be expanded or contracted to as many levels as needed to serve any size area covered by the Area Wide Centrex and to service any number of stations and central office switches. The links 23 and 25 between the CO'S and the local area STP's are dedicated CCIS links, typically SS#7 type interoffice data communication channels. The local area STP's are in turn connected to each other and to the regional STP 31 via a packet switched network. The regional STP 31 also communicates with the ISCP 40 via a packet switched network.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 2, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE for programming the data base in the SCP 43 for the services subscribed to by each individual business customer.

Figure 3:
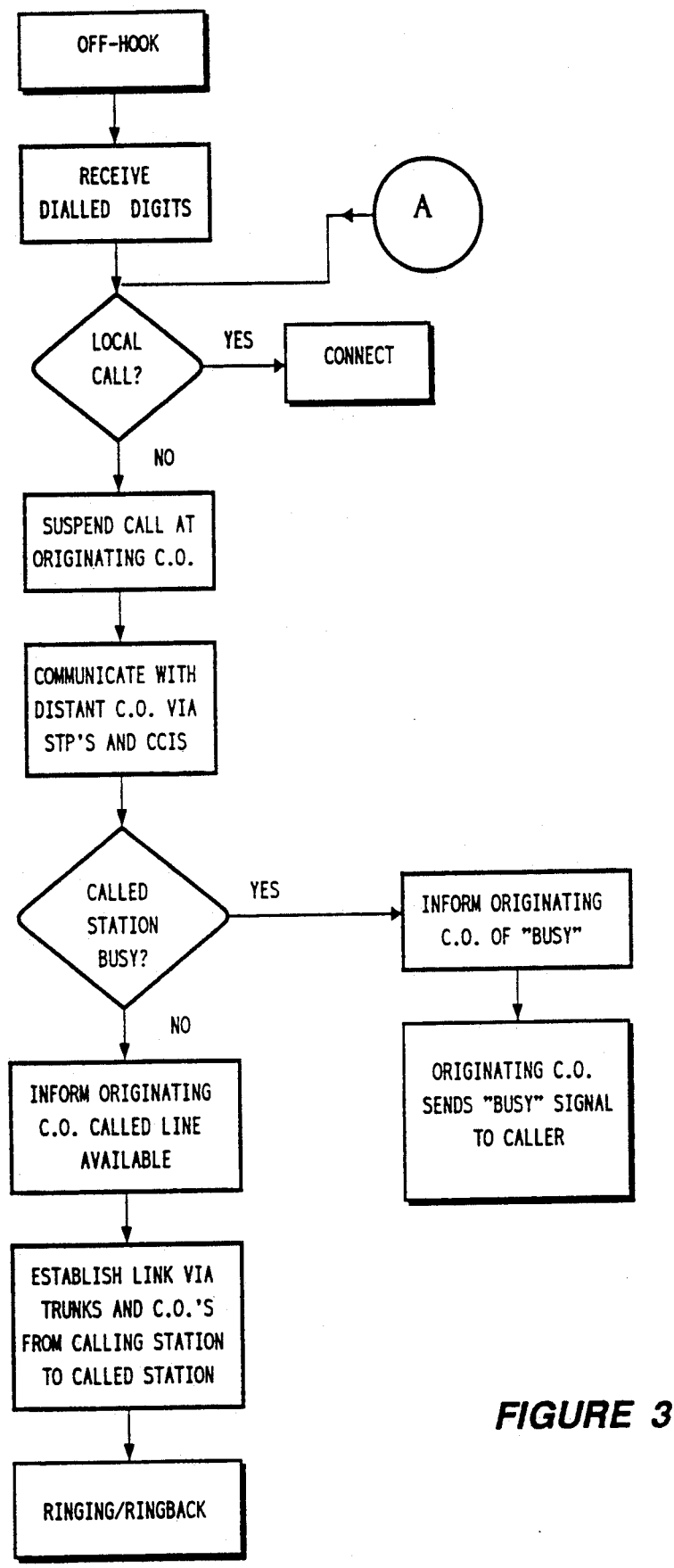
FIG. 3 is a flow chart depicting the routine for normal call processing in a network implementing the Area Wide Centrex service.

Each central office switching system normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnection the two CO's. FIG. 3 illustrates in simplified flow chart form a routine for such normal call processing. This routine is similar to that used in existing networks to complete calls between stations connected to different central offices. In an AIN system implementing Area Wide Centrex service, this normal call processing routine would still be executed for completion of calls originating from stations not subscribing to the Area Wide Centrex service.

In the method shown in FIG. 3, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary.

If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited trunk capacity. The CCIS system through the STP's was developed to alleviate this problem.

In the CCIS type call processing method illustrated in FIG. 3, the local central office suspends the call and sends a query message through one or more of the STP's. The query message goes to the central office to which the called station is connected. The receiving central office determines whether or not the called station is busy. If the called station is busy, the receiving central office so informs the originating central office which in turn provides a busy signal to the calling station. If the called station is not busy, the receiving central office so informs the originating central office. A telephone connection is then constructed via the trunks and central offices of the network between the calling and called stations. The receiving central office then provides a ringing signal to the called station and sends ringback tone back through the connection to the calling station.

Figure 4:
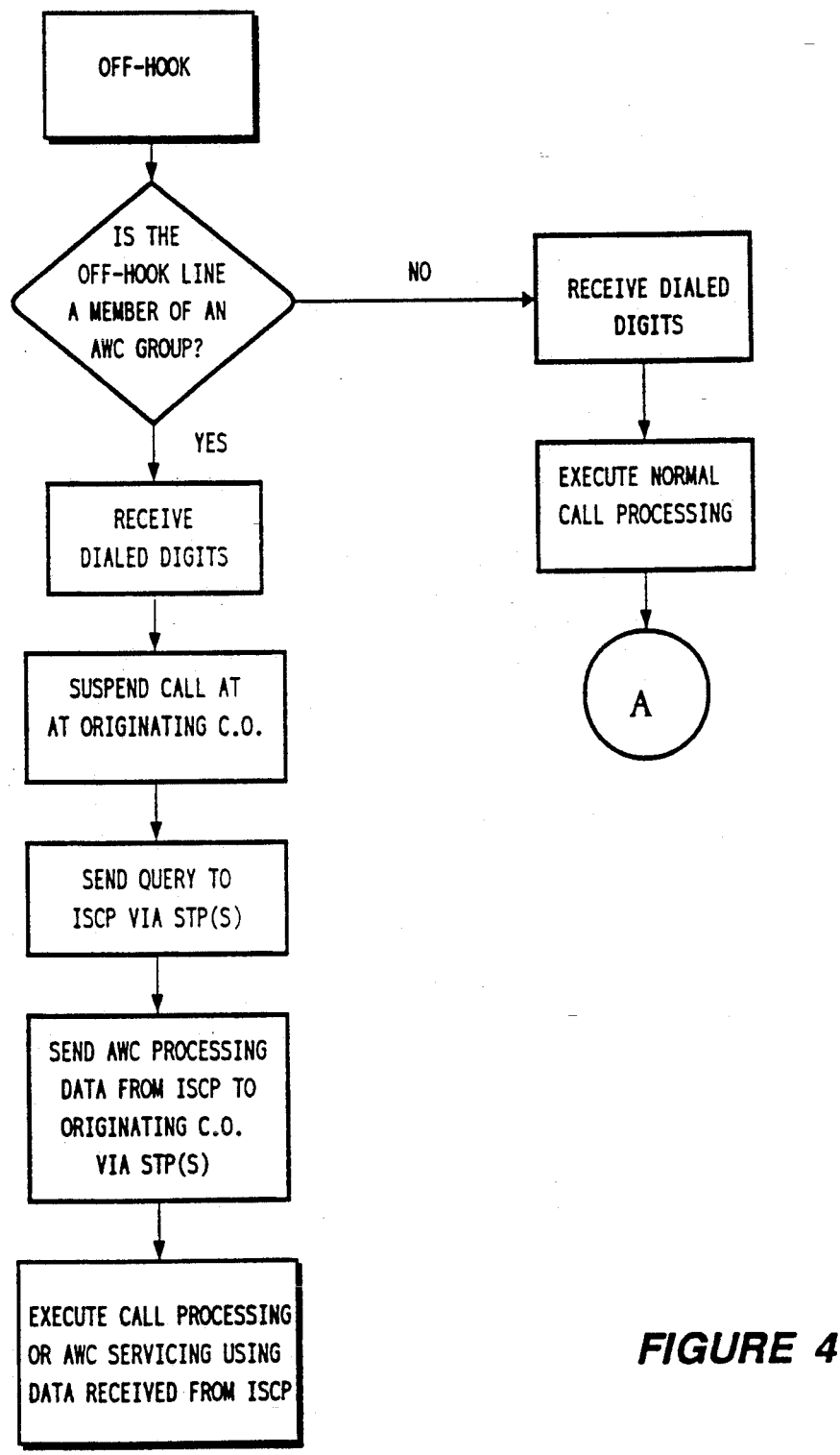
FIG. 4 is a flow chart showing the added call or service processing involved in providing Area Wide Centrex services.

The local CO's would be programmed to recognize any call or service request originating from any of the business group lines as an Area Wide Centrex Call. In response to such a call origination type trigger, the local CO would communicate with the ISCP via an STP to obtain all necessary call processing data to extend a requested Centrex service to the originating business group station. FIG. 4 shows, in simplified form, the added call or service processing involved in providing Area Wide Centrex services.

With reference to FIG. 4, after the central office switching system detects an off-hook, it must initially determine whether or not the call originates from a line subscribing to the Area Wide Centrex service. In the simplest case, this means checking a translation table in the central office to determine if the line which just went off-hook is an AWC line. If not an AWC line, the system receives dialed digits and executes normal call processing routines for completing the call, for example by executing the steps starting at point A in FIG. 3.

If the call originates from an AWC line, the originating office receives dialed digits, suspends the call and sends a query message up to the ISCP. This query message is in the above described TCAP format for an initial query from an SSP. Specifically, the office sends the TCAP query via a dedicated CCIS link to an STP. The STP recognizes that the query is addressed to the ISCP and retransmits the query, either directly or through a further STP, and through the packet switched network as in FIG. 2, to the ISCP.

The ISCP uses the originating party telephone number to identify the particular business customer. The calling number and/or the dialed digits are then used to identify processing data needed to provide the requested AWC service from a stored data table associated with the particular business customer. The ISCP then formulates an appropriate response message, again in the format specified by TCAP, and transmits the response message back to the originating central office via the packet switched network, STP(s) and CCIS link.

The originating office then provides the requested service based on the received processing data. In one simple example, if the requested service is an extension dialing, the dialed digits might represent a minimum of three or four digits of the called station's number. The response message would then provide the complete number of the called station, and the system executes normal call processing routines for completing the call using the complete telephone number received from the ISCP. In this simple example, the system would again execute the steps starting at point A in FIG. 3.

As described above, for all calls from designated Area Wide Centrex lines, the SSP queries the ISCP and processes each call based on the data returned by the ISCP. It is also possible to program the SSP to process certain calls, for example calls dialing certain numbers, as normal calls without reference to the ISCP data base. In particular, the SSP might recognize 911 emergency calls and process those calls in the normal manner without accessing the ISCP.

Although shown and described above as a single query and response message, the local central office and the ISCP may send messages back and forth several times. For example, if the data stored in the ISCP indicates additional data is needed, the first message back to the originating office might instruct that office to generate a prompt (speech or tone) requesting that the originating subscriber dial in additional digits. This might be the case if the stored data indicated some level of access control or restriction relating to the requested service, in which case the additional dialed digits might represent a personal identification number. The originating central office would then transmit the additional data to the ISCP for further processing, e.g. comparison against stored data. In some cases it may also be appropriate for the originating office to request additional data from the ISCP in order to accumulate sufficient data to completely process the call. In fact, there is a window of approximately 50 milliseconds during which data can be communicated back and forth between the ISCP and the originating central office. This allows time for 4 or 5 query and response sequences, as needed for a particular service application.

The above discussed flow charts show substantial processing at the local central office level. Ultimately, all processing could be transferred to the ISCP level, and the central office switch would become a dumb system controlled by commands sent from the ISCP. For example, in such an implementation, determination of whether or not a call or service request originated from an AWC line would itself entail a query to the ISCP to check the data base and look up the identity of the originating line.

Figure 8:
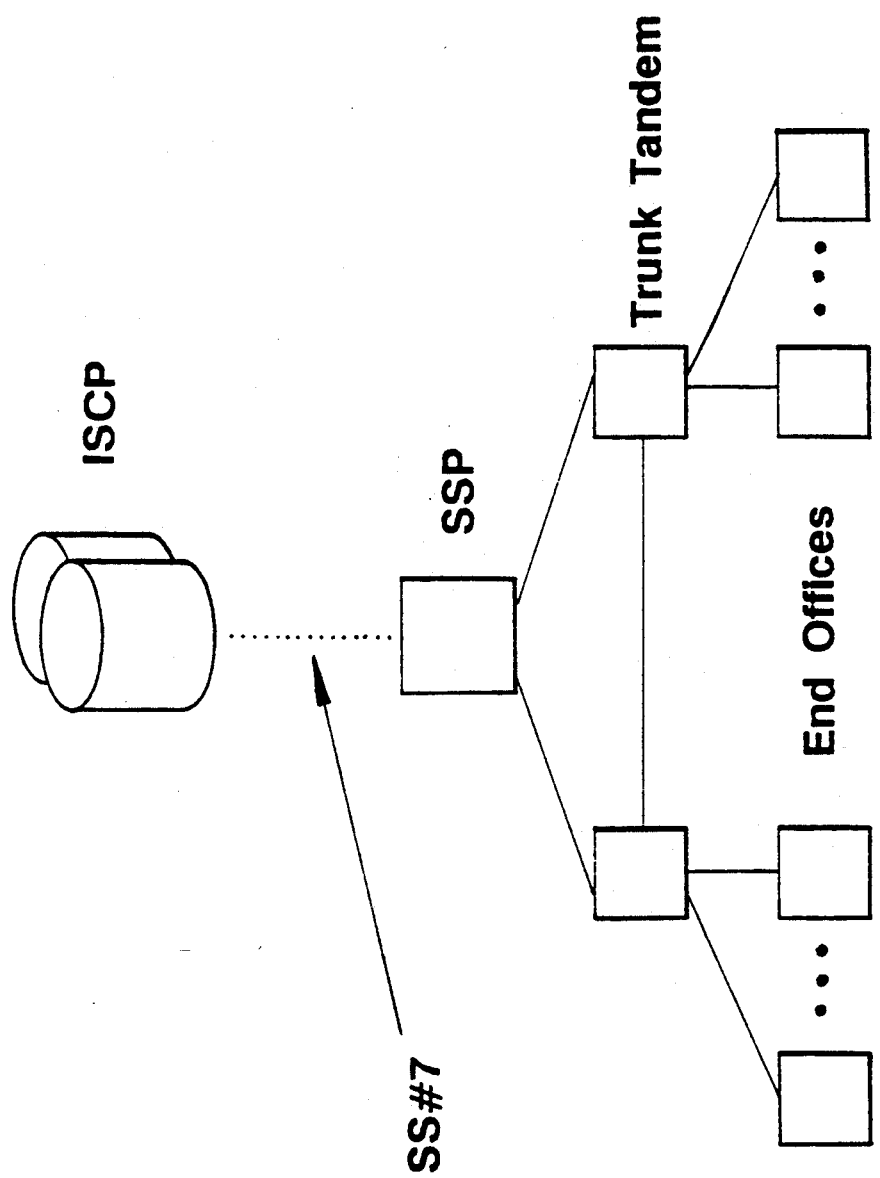
FIG. 8 shows an alternate system for implementing the Area Wide Centrex wherein none of the end office switches have SSP functionality.
Figure 9:
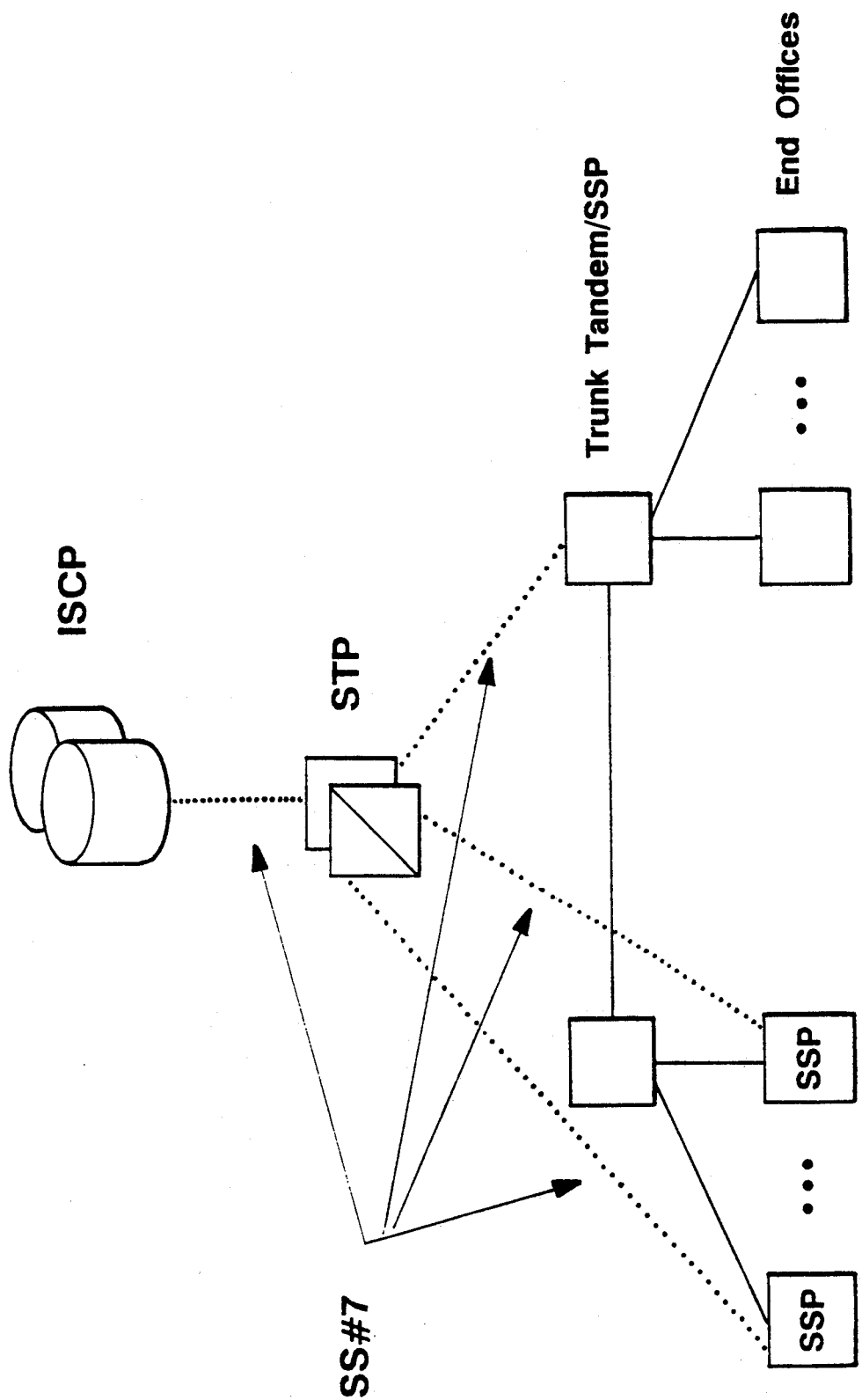
FIG. 9 shows another alternate system for implementing the Area Wide Centrex wherein only selected end office switches have SSP functionality.

The above described data signalling network between the CO's and the ISCP is preferred, but other signalling networks could be used. For example, instead of the CCIS links, STP's and packet networks, several CO's and the ISCP could be linked for data communication by a token ring network. Also, the SSP capability may not always be available at the local office level, and several other implementations might be used to provide the requisite SSP capability. For example, as shown in FIG. 8, none of the end office switches may have SSP functionality. Instead, each end office would connect to a trunk tandem which in turn feeds calls to a central SSP capable switch. The SSP then communicates with the ISCP, as in the implementation described above, but in this case via an SS#7 type CCIS link. In the embodiment of FIG. 9, some of the end offices are SSP capable, and some are not. Again, each of the end offices normally communicates through a trunk tandem. For the SSP capable switches, they communicate directly with an STP which relays communications to and from the ISCP, in the same manner as in the embodiment of FIGS. 1 and 2. For those end offices which lack SSP capability, calls are forwarded to the SSP capable trunk tandem which in turn relays the calls in a manner similar to that of FIG. 8. In the embodiments of FIGS. 8 and 9, the SSP capable trunk tandem switches are digital switches, such as the 5ESS switch from AT&T; and the non-SSP type end offices might be 1A analog type switches.

The "Area Wide Centrex" service will provide a number of Centrex features for processing customer's outgoing calls through multiple end offices to geographically separate facilities of business customers. Inter-location transport will be provided through public network or private dedicated facilities via a Centrex, a Private Branch Exchange (PBX), a Key telephone system, or a residential POTS line. End user access via a corporate abbreviated dialing plan will operate across the network as if all of the customer's locations were served by a single switch. The billing for Area Wide Centrex calls can be either flat message rate or by individual or groups of nodes.

The Area Wide Centrex service relies on a central data base at the ISCP to control the Centrex operations through multiple end offices. Local and toll offices of the public telephone network compile a call data message for Area Wide Centrex calls and forward that message via a CCIS link to an Integrated Service Control Point or ISCP. The ISCP accesses stored data to translate the received message into a call control message and returns the call control message to the offices of the network via CCIS link. The network offices then use the call control message to complete the particular call in accord with the customer's particular active Centrex service features. For ordinary telephone service calls by non-Centrex subscribers, the local and toll office switches would function normally and process such calls without referring to the ISCP data base for instructions.

Features

The Area Wide Centrex provides the following specific service features:
A. Extension Dialing
B. Call Transfer
C. Routing Control
D. Work-at-Home
E. Centralized Station Message Detail Recording (SMDR)
F. Access Authorization The implementation of the five listed features in the Area Wide Centrex system will be described below.

A. Extension Dialing

The extension dialing feature allows a multilocation customer to provide a specialized, abbreviated dialing plan for calls between their locations. Using this feature, an Area Wide Centrex station user can call any other station in the Area Wide Centrex network using the specialized dialing plan. This feature will offer multilocation Centrex customers a uniform abbreviated dialing plan between their PBX locations, Centrex locations, ISDN lines, and residential lines for people working from home, etc.

With reference again to FIG. 4, after the central office switching system detects an off-hook and receives dialed digits, it determines whether or not the call originates from a line subscribing to the Area Wide Centrex service. If not an AWC line, the system executes normal call processing routines for completing the call, for example by executing the steps starting at point A in FIG. 3. If the call originates from an AWC line, the originating office suspends the call and sends a query message up to the ISCP through the STP's. This query message, in TCAP format, identifies the calling station and the digits dialed. For an extension dialing service, the dialed digits might represent a minimum of three or four digits assigned to the called station's number. Depending on the dialing plan used, two of which will be discussed later, the digits may be selected digits from the actual telephone number assigned to the called station or a number totally independent from the called stations telephone number. Based on the identity of the business group determined by the calling party's address, the ISCP retrieves from its data base the complete telephone number of the called station corresponding to the dialed extension number. The ISCP then formulates a response message, again in TCAP format including the complete destination number and any other routing information which might be necessary to complete the call, and transmits the response message back to the originating central office via the STP(s). The destination number could theoretically be any number, American or International. The system then executes normal call processing routines for completing the call using the complete telephone number and/or routing information received from the ISCP by executing the steps starting at point A in FIG. 3.

In the example of FIG. 1, suppose that employee John Doe is located in the Arlington/Alexandria area and is assigned extension number 1234. His actual telephone number might be 703-456-7890. To call John Doe, any other employee of company X would only have to dial extension 1234, and the ISCP would provide the complete 703-456-7890 number to complete the call to John Doe's telephone line in the Arlington/Alexandria office. This would be true whether the other employee was calling from the headquarters in Richmond, the shipping facility in Norfolk, the assembly plant in Roanoke or the office in the Arlington/Alexandria area. In the example given, the four-digit extension number is an arbitrary number unrelated to the actual telephone number of the employee's telephone line. Alternatively, the extension number could be a selected subset of the digits of the actual telephone number, for example the last four digits.

B. Call Transfer

Figure 5:
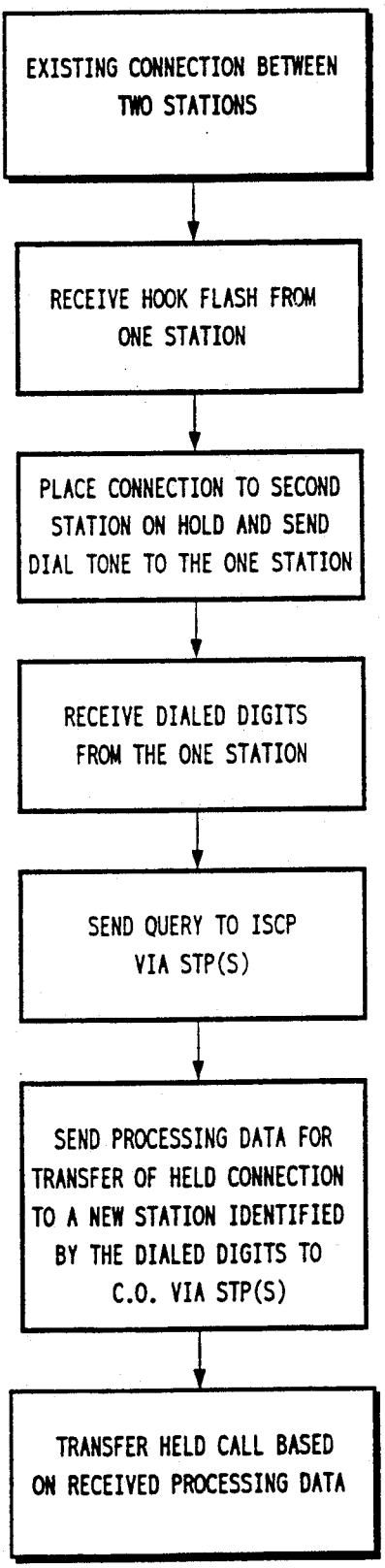
FIG. 5 is a flow chart illustrating the processing steps for call transfer in the Area Wide Centrex system.

The call transfer feature allows transfer of an existing call connection from one member of the business group to any other member of the group, regardless of which central office each member connects to. With reference to the flow chart of FIG. 5, during a call connection exists through at least one of the central office switching systems to one of the local telephone lines designated as a member of the group. During this connection, the system receives a transfer request from the one local communication line. The transfer request will typically be a switch hookflash. The central office connected to the line requesting transfer recognizes that the service request originates from a line which is a member of the business group, places the existing call on hold and sends a dial tone to that line. The central office receives dialed digits identifying another member of the group. If an extension dialing plan is used, the digits would be those of an extension number. The originating central office sends a query, in TCAP format, to the ISCP via the STP(s). The query includes data identifying the requesting station (and thereby the business group) and the dialed digits. The ISCP accesses a data table for the business group to obtain call processing data to transfer connection from the requesting line to the other line identified by the dialed digits. If the dialed digits were an extension number, the retrieved data would include the complete telephone number of the destination line. The ISCP sends a TCAP response message, including the retrieved call processing data, back to the central office via the STP(s). The central office then utilizes the accessed call processing data to transfer the existing call to the other lines.

In the example of FIG. 1, suppose that employee John Doe located in the Arlington/Alexandria area is assigned extension number 1234, and his actual telephone number is 703-456-7890. Employee Jane Smith in the company's shipping facility in Norfolk is engaged in a telephone conversation with an outside party and decides to transfer the call to John Doe. Jane Smith flashes the hookswitch on her telephone and hears a new dial tone. She then dials John Doe's extension number 1234. The ISCP would provide the complete 703-456-7890 number and the system uses that number to transfer the existing connection to the outside party to John Doe's telephone line in the Arlington/Alexandria office.

C. Routing Control

To provide economics or efficiencies in traffic handling, the Area Wide Centrex service will route calls to different customer locations based on customer specified parameters, such as calling/called party number, time-of-day, day of the week, authorization codes, etc. If the Area Wide Centrex routes a call over private facilities, three separate trunk groups may be specified. If all three trunk groups are busy, then the call would overflow to the public network.

Operation of this feature can also be understood by reference to the general operation flow chart of FIG. 4. Again, after the central office switching system detects an off-hook, it determines whether or not the call originates from a line subscribing to the Area Wide Centrex service. If not an AWC line, the system receives dialed digits and executes normal call processing routines, whereas if the call originates from an AWC line, the originating office receives dialed digits, suspends the call and sends a query message up to the ISCP through the STP's. This query message, in TCAP format, identifies the calling station and the digits dialed as well as other pertinent information. Based on the identity of the business group determined by the calling party's address, the ISCP retrieves from its data base a table of trunk group routing information. The ISCP formulates a response message, again in TCAP format, including the routing information, and transmits the response message back to the originating central office via the STP(s). The system then executes normal call processing routines for completing the call using the received routing information provided by the ISCP.

In one example, the routing control information stored in the ISCP data base would specify three trunk groups, in priority order. For example, the first trunk group might be a group of private tie lines, the second trunk group might be AT&T WATS lines and the third might be through MCI trunk lines. Upon receiving the TCAP response message including the identification of the three trunk groups in priority order, the central office would use the highest priority trunk group then available to complete the call, and if all specified trunk groups are busy, complete the call through the standard direct dial telephone network.

The Area Wide Centrex system can provide customers other types of routing control routines, as desired by each customer. Instead of specifying priority order, the stored data might identify different trunk groups for use at different times of day. The TCAP response then would identify a single trunk group, based on the current time, which the switch would then use to complete the call. Also, instead of specifying private trunk groups, such as tie lines, the stored routing data could specify one or more trunk groups, or even individual trunk circuits, through the public switched telephone network itself. The programmability of the customer's stored data allows each customer a virtually unlimited selection of routing control routines, so that each business can customize its routing control to match its available trunk resources and its communication needs.

The call routing control therefore allows a business customer to control use of available long distance resources to reduce costs. Provision of this service through the Area Wide Centrex facilitates such resource control across a number of central office switches. Setting up or modifying the routing priority requires only programming the one central data base in the ISCP.

D. Work-at-Home

The Work-At-Home feature allows the home telephone line to selectively operate as a residential line or as a business line, on a call-by-call basis. For a business call, the user would preface each call with an access indicator to identify a business call. When an outgoing call from the home line lacks the access indicator, the network processes the call as a standard residential call.

Figure 6:
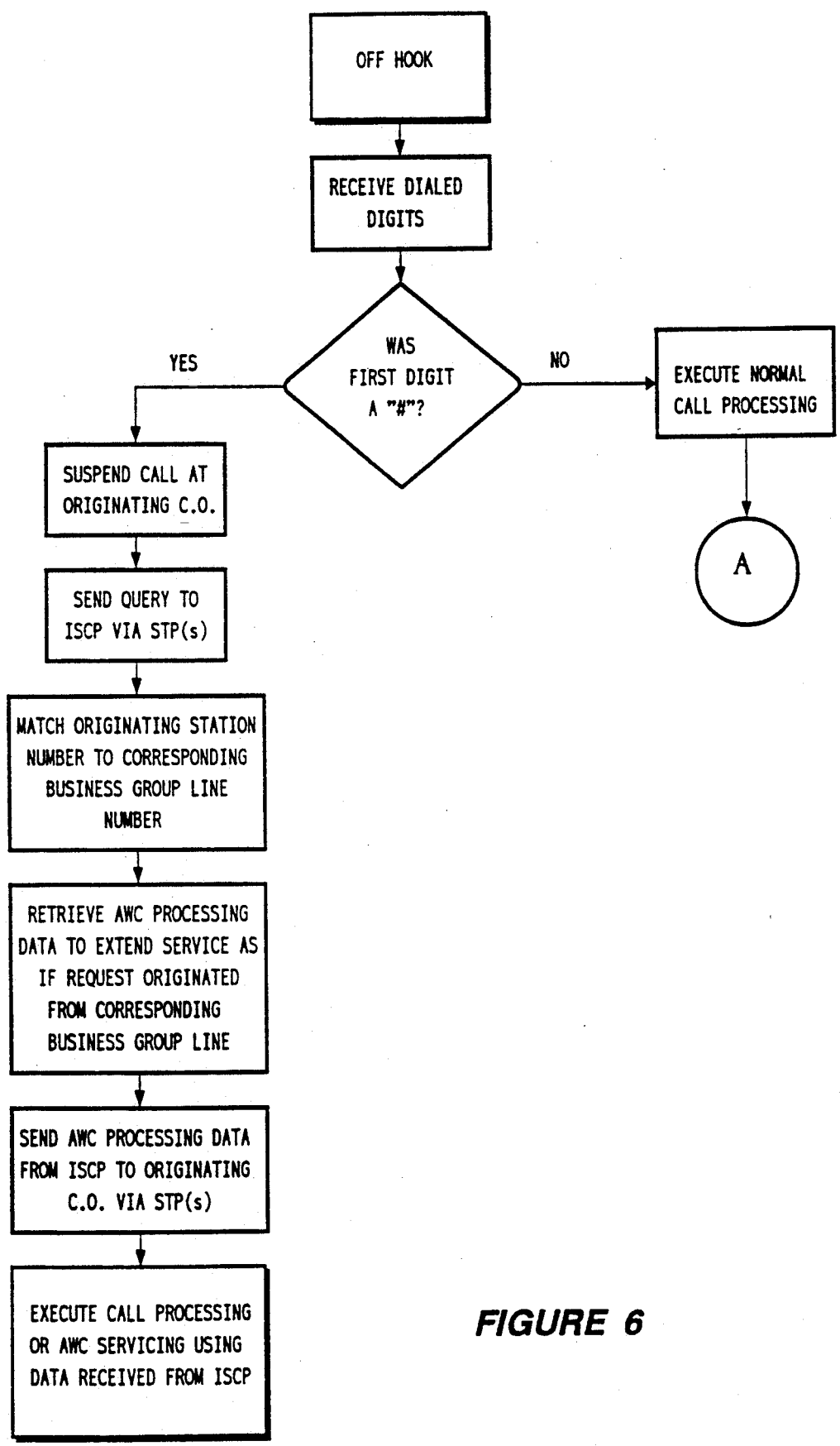
FIG. 6 is a flow chart illustrating the processing steps for the "Work-At-Home" feature which allows provision of Area Wide Centrex services to a home line.

The flow chart of FIG. 6 illustrates processing of Work-At-Home services in the Area Wide Centrex system. Typically, the telephone of a residential line goes off-hook, and the user dials digits. In the Work-At-Home feature, a special service key actuation at the originating station, such as the "#" or "*" key, triggers AIN recognition. The SSP type central office then suspends the call and queries the ISCP via the STP(s) to determine which business line the originating line corresponds to.

Typically, the ISCP stores a short table, for example including five telephone numbers, for each business line for which work-at-home calls can originate. The ISCP compares the originating home line number to the stored Work-At-Home tables for the business group lines and matches the home line number to one of the business lines. Based on the identified business line, the ISCP retrieves processing data for completing the call or providing other services as if the service request originated from the business group line.

The ISCP formulates a response message, again in TCAP format, including the processing data. The TCAP response message format includes data fields for billing information, and the response message will include sufficient information to allow billing for the call against the identified business group line. The ISCP transmits the response message back to the originating central office via the STP(s). The system then executes call processing routines to provide the requested AWC service using the data received from the ISCP.

In response to the access indicator trigger, the Area Wide Centrex service provides business features to the home line just as the service would provide to the office line, including for example extension dialing, call routing control, call transfer, and recording SMDR type information. Outgoing business calls can be billed to the associated office line.

In the above description, the Work-at-Home feature uses some form of special key actuation as the access indicator, and the flow chart of FIG. 6 illustrates such a method of operation where the "#" key serves as the special key. It is possible, however, to use other access indicators or triggers. For example, the home line might be identified for AIN processing, in which case the SSP switch queries the ISCP data base in response to every off-hook. The ISCP then decides whether the current call should be processed as a normal residential call or as an AWC Work-at-Home call, based on information stored in the data base. The stored data might specify Work-at-Home call processing for certain times and/or days of the week. Alternatively, the data might identify whether the Work-at-Home service has been toggled on by an initial call to a common number assigned to the specific business group customer, after which all calls from the home line are processed as AWC calls and can access all features of the AWC service associated with the particular business group. Another approach might be to decide whether the call was a Work-at-Home call based on the dialed destination number; if the number corresponds to a member of the business group with which the home line is associated, the call is processed and billed as an AWC Work-at-Home call.

The telephone communication system used to implement the Area Wide Centrex service could also route incoming business calls to the home line. In one embodiment, the incoming calls would be routed to the home line using existing call forwarding options. In future, however, the network would process the incoming calls as AIN type calls and control connection to different destination stations based on data stored in the ISCP. In such a system, each call directed to the business line would also trigger a query to the ISCP. Based on its stored data, the ISCP would instruct the SSP switch to complete the call either to the business line or to the associated Work-at-Home line. For example, the ISCP might provide data to complete incoming calls to the business line at certain times, but at other specified times, provide data to complete such calls to the home line.

E. Centralized SMDR

Centralized Station Message Detail Recording or SMDR will provide one centralized station message detail report for all Area Wide Centrex stations instead of the switch-by-switch report done for prior art Centrex implementations. Three types of results could be made available to an Area Wide Centrex customer: raw data such as time of call, calling number, called number, routing number, etc.; statistics such as number of blocked calls; and calculated values such as average duration of calls. Each type of data can be made available on a customized basis, e.g., for individual users.

As discussed earlier, each query includes the caller's telephone number identified by the Service Key portion of the TCAP query message. Each central record is driven by a telephone number. Thus every time an SSP makes a query to the ISCP and the ISCP responds, the Data and Reporting System (DRS) portion of the ISCP captures the data and stores an appropriate record of the transaction in a record corresponding to the telephone number of the party requesting the Centrex service. Based on the queries and responses, the record will indicate the type of service requested and the instructions for disposition of the call. The time of initiating the service request is known from the time of receipt of the query, i.e., by subtracting the known maximum period for transmission of the query from an SSP to the ISCP from the time of receipt of the query.

If the call duration is to be included in the reports, the DRS must also capture information indicating the time of termination of the call. The SSP type switch could be programmed to provide a further message to the ISCP upon completion of each Area Wide Centrex call. The further message would be routed to the ISCP in the standard manner but would indicate the time that the call or service terminated.

During subscription to Area Wide Centrex, for each of the customer's Area Wide Centrex lines the customer specifies the information to be collected, the method and time of information collection, the type of results, and the format and frequency of reports, and the SCP data base is programmed to control the DRS to provide the specified reports.

Initially, the reports would likely be provided in the form of printouts mailed to the customer on a specified periodic basis. In the preferred implementation, each business customer will have one or more data terminals set up to receive the reports over a data link to the ISCP, for example via modems and dial up telephone lines. The data in the SCP could also specify the time and telephone number to deliver the reports to each of the customers' terminals.

F. Access Authorization

Figure 7:
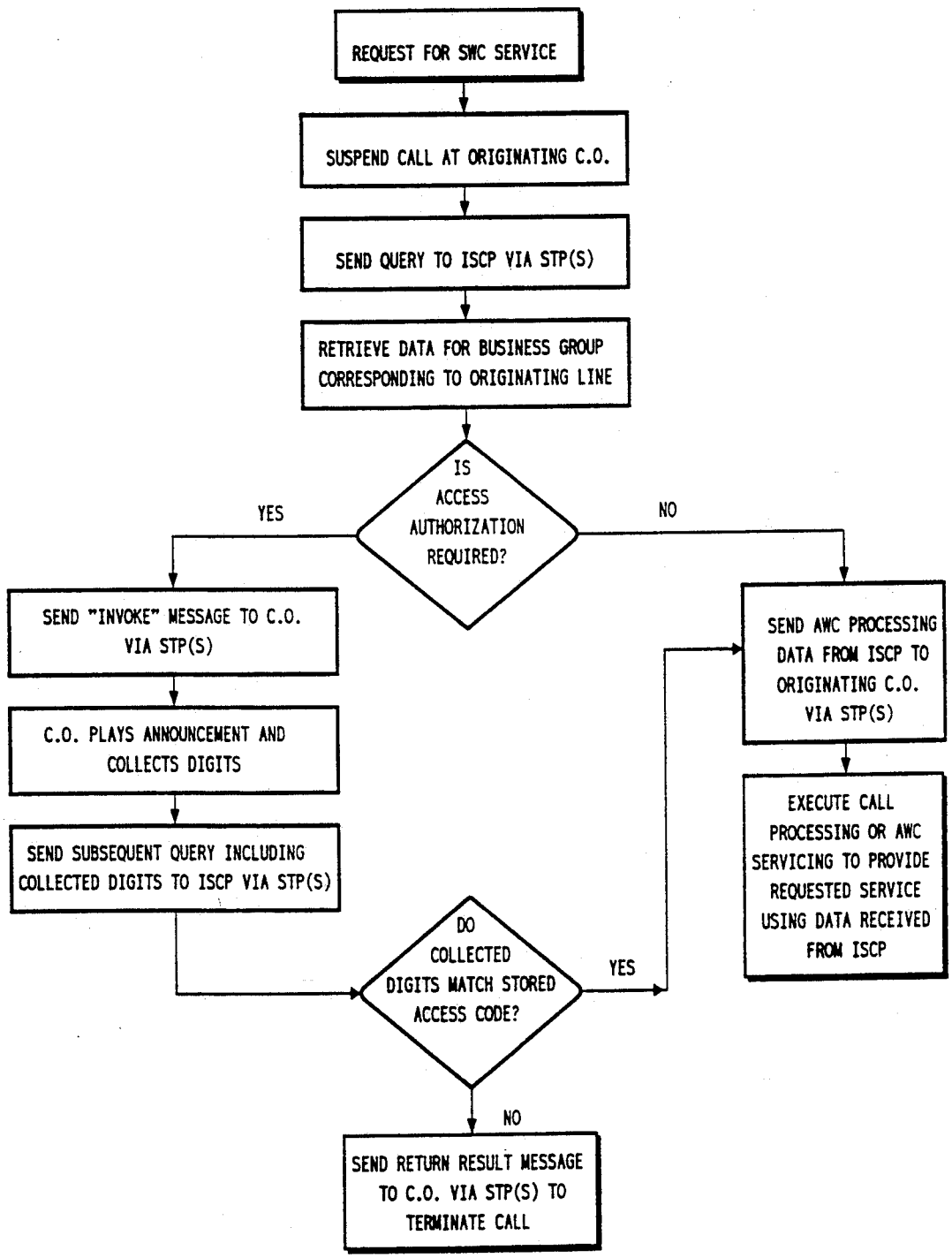
FIG. 7 is a flow chart showing the steps added to the other Area Wide Centrex routines to add access authorization control to any of the Area Wide Centrex features.

Security for access to specific subscriber facilities, to override station restrictions, or to access the Area Wide Centrex features can be provided via the use of the calling number, an authorization code, or a combination of both. At the business customer's request, access control can be added to any of the Area Wide Centrex service features, including extension dialing, call transfer, and Work-At-Home. The access control can also be implemented as part of the call routing feature to restrict access to long distance facilities. FIG. 7 illustrates the modification of operations necessary to add access authorization to any one of the other Area Wide Centrex service features.

For a call or service request originating at any station covered by the Area Wide Centrex service, at some point after the end user dials the desired number, the network suspends call processing and sends a query to the ISCP in the usual manner. The ISCP retrieves the data for the business group corresponding to the originating line. The ISCP at this point checks the retrieved data and determines whether or not the business customer has requested an access authorization procedure for the specific service now requested. Each business customer can select in advance whether all services require access authorization or whether only certain services require authorization. For example, although access authorization might not be required for calls from the actual office lines, Work-At-Home calls might require access authorization, to prevent family members from billing long distance charges against the office line.

If the retrieved data for the business customer indicates that no access authorization is required for the specific service now requested, the system processes the call in the usual manner. The ISCP formulates a response message, again in TCAP format, including the necessary processing, and transmits the response message back to the originating central office via the STP(s). The system then executes normal call processing routines for servicing the call using the information received from the ISCP.

If instead the retrieved information indicates that access authorization is required for the specific service now requested, the ISCP sends a TCAP "INVOKE" message. The INVOKE message instructs the originating central office to provide an announcement to the user. The announcement could be in the form of a subsequent dial tone or synthesized speech requesting entry of an access authorization code. The INVOKE message also instructs the originating central office to subsequently collect digits. The central office collects digits, for example DTMF dialed digits, and sends a subsequent query to the ISCP via the STP(s). The subsequent query includes the collected digits.

The ISCP checks the entered code against a list of valid codes provided by the subscriber. If the subscriber has specified additional screening, the calling number could be matched against a list of valid calling numbers. If the code is not valid (and the calling number when used), the ISCP sends a return result message instructing the CO to terminate the call. Although shown and described as a single query and check for a valid code, the data base could provide instructions to go back and repeat the request and code entry procedure allowing the user a specified number of attempts to enter a valid code before denying service.

If the code digits match a valid code (and the calling number when used), the network resumes call processing and routes the call to the appropriate destination. The ISCP formulates a response message, including the necessary processing data, and transmits the response message back to the originating central office via the STP(s). The system then executes normal call processing routines for servicing the call using the information received provided by the ISCP.

As an alternative to screening based on an access authorization code, calls could be screened based on calling number alone.

Dialing Options

The Area Wide Centrex system also supports two dialing plan options for each of the specific service features: location code dialing, and portable intercom dialing.

For the location dialing option, one or more leading dialed digits indicate a particular subscriber location, and the last four digits correspond to the station's North American Memory Plan (NAMP) telephone number. This dialing scheme permits duplication of extensions among locations served by different switches, and the subscriber is not limited to 10,000 stations. For this option, however, the caller must be aware of the geographic location of the called Area Wide Centrex station.

The Portable Intercom Number Dialing option allows a customer to assign a "private number" independent of the NAMP number to each Area Wide Centrex station. This dialing plan is like a private network numbering plan, where the Area Wide Centrex users call private numbers, whereas outside callers dial the full NAMP number, to reach an Area Wide Centrex station. With this dialing option, when a user moves from one location to another, his/her NAMP number would change but not the assigned private number. This allows internal calls within the Area Wide Centrex to reach the end user using the same private number, while outside callers would have to dial the NAMP number assigned to the new location.

In the example of FIG. 1, again suppose that employee John Doe who is initially located in the Arlington/Alexandria area is assigned extension number 1234, and his actual telephone number is 703-456-7890. To call John Doe, any other employee of company X dials only extension 1234 and the ISCP provides the complete 703-456-7890 number to complete. Now John Doe moves to the headquarters in Richmond, and his actual telephone number becomes 804-234-5678. The data base at the ISCP is revised to indicate John Doe's new location. Subsequently, employees of company X need only dial the same old extension number 1234, and the ISCP provides the new complete number 804-234-5678 allowing call connection to the actual station at John Doe's new location.

In one implementation, the changes in the data base will probably be made manually by a telephone company technician. Specifically, a technician operating the ISCP would enter changes in the assignment of extension numbers to corresponding NAMP numbers. The customer would ask the telephone operating company for a change, and the operating company would issue a service order to the technician for each change. The technician would then use the SCE 42 terminal to actually enter the changes into the data base.

If extreme flexibility were desired, an appropriate automated voice response system could be provided. The voice response system would provide synthesized speech prompts and accept DTMF inputs to allow individual employees to call in and enter their own changes in the ISCP. Under this approach, the extension number assignment would be quite dynamic and could track even short term movements of the employees.

In the preferred implementation, each business customer will have a single terminal, and would call in and establish a data link to the ISCP via modems. Typically, the terminal would be assigned to a corporate communications officer, and only that officer would have access to the customer's call processing records resident in the data base through the terminal. Security is controlled through the terminal and/or the line from which the terminal calls in to the ISCP. The terminal may have a built in security code which the ISCP verifies before granting access to the data base, or the ISCP may check the originating telephone number and the terminal identity number against a stored number from which that terminal is expected to call. The corporate business officer might also have an assigned personal identification number (PIN). This single terminal per customer approach allows the customer to change the numbering data fairly frequently, but limits access to the data base to one customer representative and thereby reduces the potential for unauthorized access to sensitive data.

In the preferred implementation, the corporate officer obtains direct access through the terminal to all of the programming in the data base associated with that business customer. Among other changes, the corporate officer would then have the ability to change the assignment of extension numbers to corresponding NAMP numbers. To move an extension number with movement of an employee, the employee might call the corporate communication officer and describe the move. The officer then accesses the ISCP through the terminal and effects the desired change.

From the above, it should be clear that the Area Wide Centrex methods and system extend a variety of Centrex service features to customer facilities connected to different central offices. Area Wide Centrex provides the networking capability to allow services previously provided by a Centrex in one central office to extend out and operate between different central offices. To the user, the system looks as though it is provided from a single central office regardless of the user's location. Also, Area Wide Centrex permits establishing or changing a business customer's centrex services by reprogramming a single centralized data base, without having to change the programming in each individual central office exchange to which that customer's facilities connect.

We claim:

1. An area wide centrex communication network, comprising:

local communication lines;

a plurality of interconnected central office switching systems each at a different location, wherein each of said central office switching systems connects to a plurality of said local communication lines, each of said central office switching systems responding to a service request on a local communication line connected thereto to selectively provide a communication connection between the requesting line and another selected local communication line through the connected central office switching system or through the connected central office switching system and at least one other central office switching system;

an integrated services control point, separate from the central office switching systems, said integrated services control point comprising:

(i) a data base storing call processing data associated with at least one of the local communication lines connected to each of at least two of the central office switching systems which are designed as members of a business group for providing to the business group a plurality of Centrex service features including extension number dialing using extension numbers consisting of a predetermined number of digits fewer than a minimum number of digits necessary to completely identify a destination local communication line, call transfer and call routing control, (ii) a service management system connected to said database, and (iii) a data and reporting system for capturing and storing a data record of Centrex service features provided to the members of the business group;

a signalling communication system for two-way communications of data messages, said signalling communication system interconnecting the central office switching systems and connecting the central office switching systems to the integrated services control point;

wherein:

in response to a request for service from one of the local communication lines designated as members of the business group, the central office switching system connected to that one line initiates access to the data base in the integrated services control point to obtain call processing data associated with said business group for at least one of the Centrex service features; and in response to the obtained call processing data the network provides the at least one Centrex service feature to the one designated line.

2. An area wide centrex communication network as in claim 1, wherein each of the at least two of the central office switching systems comprises a programmable digital switch.

3. An area wide centrex communication network as in claim 2, wherein each programmable digital switch is programmed to recognize that the service request originates from one of the designated local communication lines.

4. An area wide centrex communication network as in claim 2, wherein each programmable digital switch is programmed to respond to every service request by initiating a query to the data base, and the data base stores sufficient data to recognize from the query that the service request originates from one of the designated local communication lines.

5. An area wide centrex communication network as in claim 6, wherein the signalling communication system comprises at least one switching transfer point for routing data messages between the central office switching systems and the data base.

6. An area wide centrex communication network as in claim 5, wherein the signalling communication system further comprises common channel interoffice signalling links providing communications between the central office switching systems and the switching transfer point.

7. An area wide centrex communication network as in claim 6, wherein the signalling communication system further comprises a packet switched network providing communications between the switching transfer point and the central data base.

8. An area wide centrex communication network as in claim 1, wherein the local communication lines are telephone lines.

9. An area wide centrex communication network as in claim 1, wherein the integrated services control point further comprises a service creation environment terminal subsystem for programming the data base for the Centrex service features subscribed to by individual business groups.

* * * * *